(12) United States Patent
Baxter et al.

(10) Patent No.: US 6,901,175 B2
(45) Date of Patent: May 31, 2005

(54) TUNABLE WAVELENGTH MULTIPLEXER

(75) Inventors: Glenn W. Baxter, New South Wales (AU); Dmitri Abakoumov, New South Wales (AU); Steven Frisken, New South Wales (AU)

(73) Assignee: Engana Ltd., Eveleigh (AU)

( * ) Notice: Subject to any disclaimer, the term of this patent is extended or adjusted under 35 U.S.C. 154(b) by 220 days.

(21) Appl. No.: 10/084,489

(22) Filed: Feb. 28, 2002

(65) Prior Publication Data

US 2003/0161567 A1 Aug. 28, 2003

(51) Int. Cl.[7] .................................................. G02B 6/00
(52) U.S. Cl. ......................................... 385/11; 385/16
(58) Field of Search ................................ 385/11, 16, 36

(56) References Cited

U.S. PATENT DOCUMENTS

| | | | |
|---|---|---|---|
| 5,111,321 | A | 5/1992 | Patel |
| 5,150,236 | A | 9/1992 | Patel |
| 5,414,540 | A | 5/1995 | Patel et al. |
| 5,889,900 | A | 3/1999 | Hallemeier |
| 6,094,246 | A | 7/2000 | Wong et al. |
| RE37,044 | E | 2/2001 | Wu |
| 6,243,200 | B1 | 6/2001 | Zhou et al. |
| 6,252,644 | B1 | 6/2001 | Patel |
| 6,285,500 | B1 | 9/2001 | Ranalli et al. |
| 6,304,689 | B1 | 10/2001 | Dingel et al. |
| 6,349,158 | B1 | 2/2002 | Yang et al. |
| 6,370,287 | B1 * | 4/2002 | Liu ................................ 385/11 |
| 6,718,082 | B2 * | 4/2004 | Zhao et al. ..................... 385/16 |
| 2002/0009254 | A1 * | 1/2002 | Sui ................................ 385/16 |
| 2003/0103718 | A1 * | 6/2003 | Chen ............................. 385/22 |
| 2003/0161567 | A1 * | 8/2003 | Baxter et al. .................. 385/11 |

FOREIGN PATENT DOCUMENTS

| | | |
|---|---|---|
| CA | 2291350 A1 | 6/2001 |
| CA | 2326990 A1 | 6/2001 |
| WO | WO 01/84200 A2 | 11/2001 |

* cited by examiner

Primary Examiner—Akm Enayet Ullah
Assistant Examiner—Tina M Lin
(74) Attorney, Agent, or Firm—Townsend and Townsend and Crew LLP

(57) ABSTRACT

A device for filtering at least a predetermined selected optical signal having a predetermined wavelength range from a series of optical signals, the device comprising: a polarisation alignment means for substantially aligning substantially orthogonal polarisation states of an optical input signal so as to produce a polarisation aligned optical signal; a polarisation manipulation means for imparting a controlled polarisation manipulation to the polarisation aligned optical signal so as to output a polarisation manipulated optical signal having one of at least two distinguishable polarisation states including a first polarisation state and a second polarisation state; and an optical separation means for spatially separating the selected optical signal from the series of optical signals when the polarisation state of the polarisation manipulated optical signal is in a first polarisation state, thereby forming a first and second output optical signal, and maintaining the spatial alignment of the selected optical signal with the series of optical signals when the polarisation manipulated optical signal is in a second polarisation state so as to form a third optical output.

10 Claims, 13 Drawing Sheets

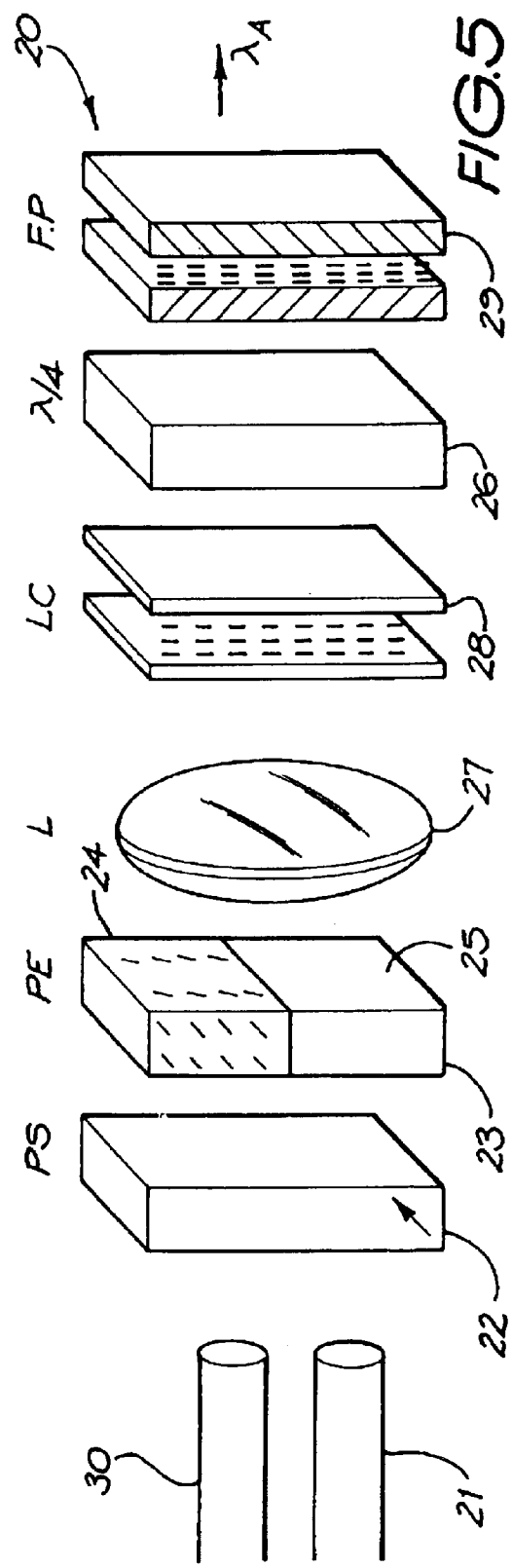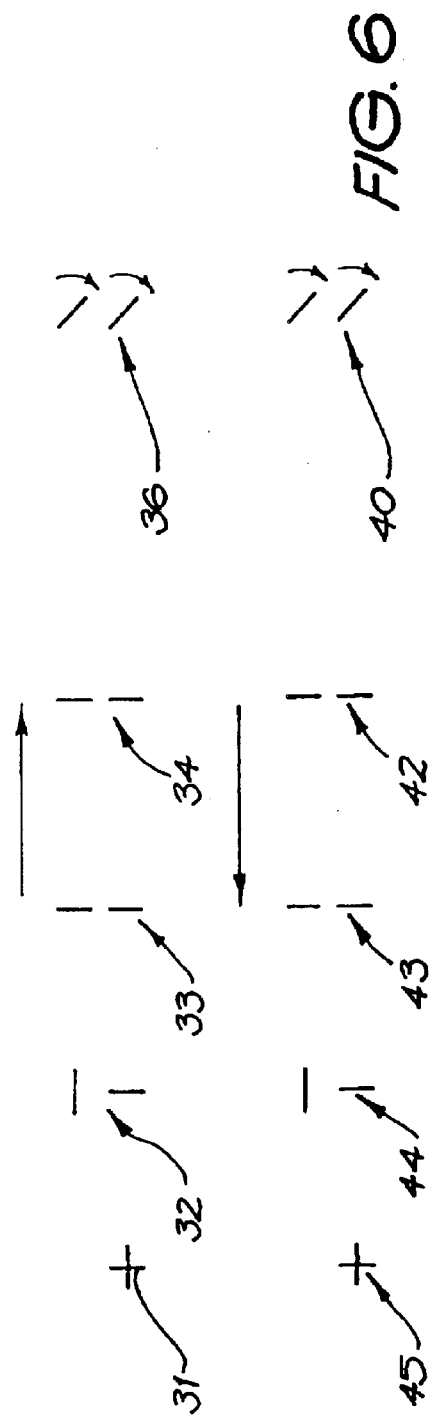

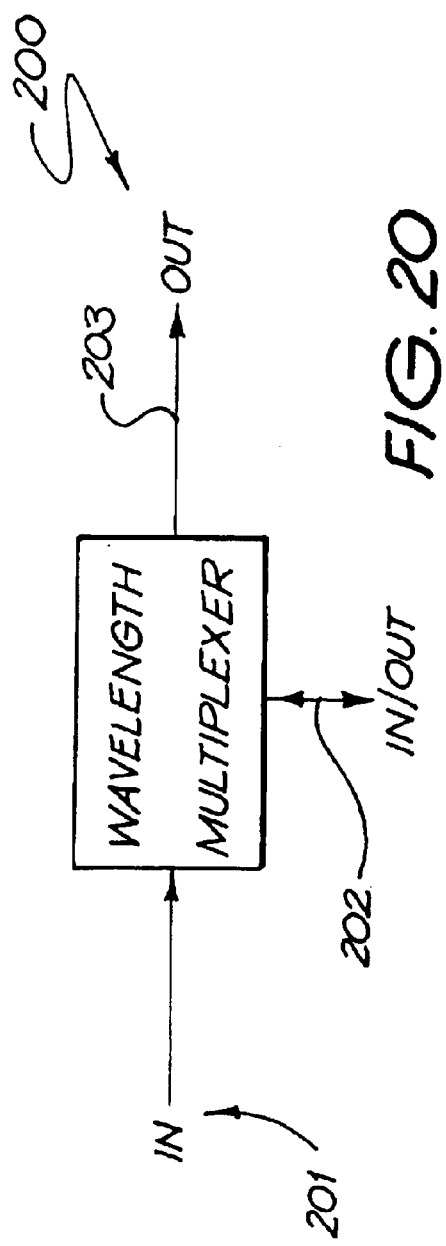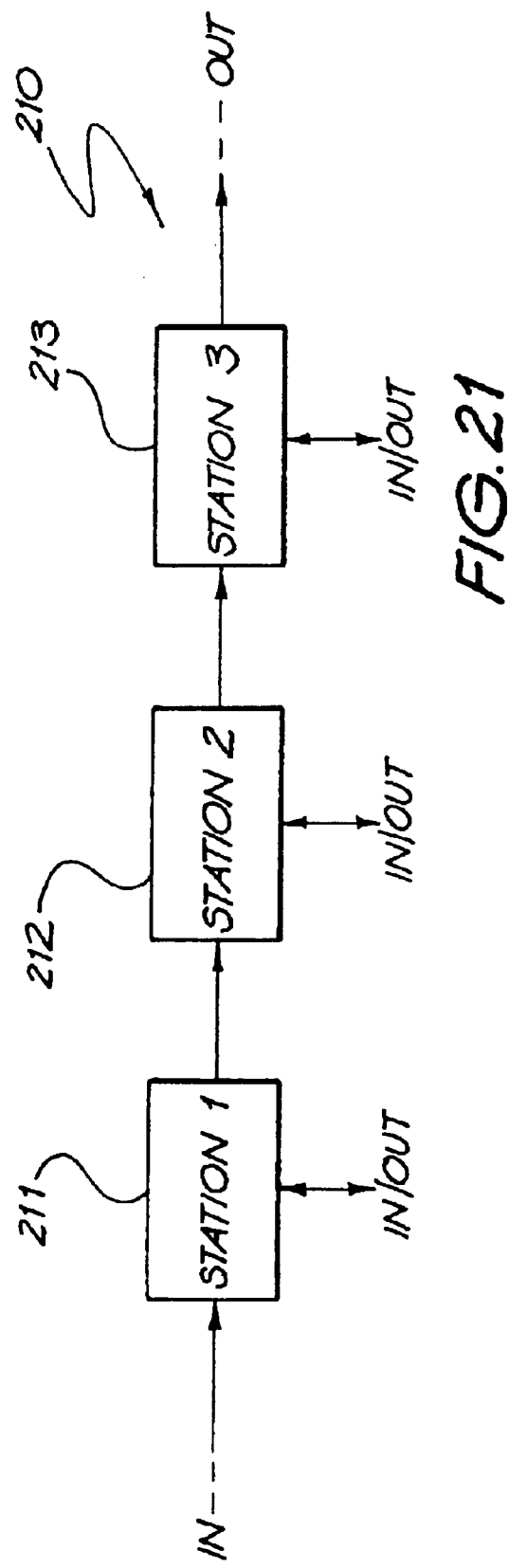

TUNABLE WAVELENGTH MULTIPLEXER

FIELD OF THE INVENTION

The present invention relates to the field of optical telecommunications and, in particular, discloses a tunable wavelength multiplexer suitable for dealing with wavelength division multiplexed signals.

BACKGROUND OF THE INVENTION

Recently, optical communications has become one of the dominant forms of telecommunications. Further, multiple wavelengths are now often utilised to transmit information over an optical fibre network or the like. In particular, wavelength division multiplexed (WDM) and dense wavelength division multiplexed (DWDM) systems are becoming increasingly popular and are thought to be the best way forward for transmitting high volumes of information over a telecommunications network.

With any DWDM system, it is necessary to be able to extract a particular wavelength channel from a signal carrying multiple wavelengths. This is normally the function of an add drop multiplexer which, as its name suggests, adds or drops channels on demand. Many different add drop multiplexers are known with the basic requirement being that the add drop multiplexer can extract a particular wavelength from a series of wavelengths or insert a particular wavelength from a series of wavelengths.

The increasing demand for optical telecommunications has lead to a high demand for add drop multiplexers. In particular, a tunable add drop multiplexer, wherein the wavelength extracted can be tuned or altered is highly desirable. Further, preferably the tuning process is a non disruptive one in that the other signals travelling on other wavelengths via an add drop multiplexer do not experience any interference during the tuning process.

SUMMARY OF THE INVENTION

It is an object of the present invention to provide for an improved add drop multiplexer.

In accordance with a first aspect of the present invention, there is provided a device for filtering at least a predetermined selected optical signal having a predetermined wavelength range from a series of optical signals, the device comprising: a polarisation alignment means for substantially aligning substantially orthogonal polarisation states of an optical input signal so as to produce a polarisation aligned optical signal; a polarisation manipulation means for imparting a controlled polarisation manipulation to the polarisation aligned optical signal so as to output a polarisation manipulated optical signal having one of at least two distinguishable polarisation states including a first polarisation state and a second polarisation state; and an optical separation means for spatially separating the selected optical signal from the series of optical signals when the polarisation state of the polarisation manipulated optical signal is in a first polarisation state, thereby forming a first and second output optical signal, and maintaining the spatial alignment of the selected optical signal with the series of optical signals when the polarisation manipulated optical signal is in a second polarisation state so as to form a third optical output.

The optical separation means can comprise an etalon filter. The etalon filter can be a tunable liquid crystal etalon filter having a tunable separation wavelength. Ideally, the etalon filter transmits the selected optical signal when the polarisation state of the second optical signal is in the first polarisation state and reflects the selected optical signal when the polarisation state of the second optical signal can be in the second distinguishable state.

The polarisation manipulation means can comprise a controlled liquid crystal device and quarter wave plate which impart a controlled rotation to the polarisation aligned optical signal to produce the polarisation manipulated optical signal. The first and second polarisation state are preferably orthogonal.

The polarisation alignment means further can comprise a polarisation separation means for spatially separating substantially orthogonal polarisation states of the input signal a polarisation rotation element for rotating at least one of the spatially separated substantially orthogonal polarisation states so as to bring it into line with the other of the spatially separated substantially orthogonal polarisation states.

The device also preferably includes an input-output optical waveguide for inputting the optical input signal; and wherein the third optical output can be transmitted to the input-output optical waveguide for output by the input-output optical waveguide and a focussing means for focusing the optical input signal.

In accordance with a further aspect of the present invention, there is provided a device for filtering at least a predetermined selected optical signal having a predetermined wavelength range from a series of optical signals, the device comprising: first and second input/output optical waveguides; a first birefringent crystal adjacent the first and second optical waveguides for spatial separation of oxthogonal polarisations; a first polarisation rotation element adjacent the birefringent crystal for rotating one of the orthogonal polarisations so as to produce an aligned polarisation output; first variable polarisation manipulation means adjacent the first polarisation rotation element for manipulating the aligned polarisation output in a controlled manner so as to produce a rotated polarisation output; and a tunable Fabry Perot etalon liquid crystal filter adjacent the first variable polarisation manipulation means for filtering a tunable wavelength from the rotated polarisation output and reflecting other wavelengths back through the first variable polarisation manipulation means, the first polarisation rotation elements, the first birefringent crystal element to the second optical waveguide. The device further preferably can include a focussing means for focussing the light emitted from the waveguides.

In accordance with a further aspect of the present invention, there is provided a device for filtering a series of predetermined selected optical signals having predetermined wavelength ranges from a series of optical signals, the device comprising: a polarisation alignment means for substantially aligning substantially orthogonal polarisation states of an optical input signal so as to produce a polarisation aligned optical signal; a first polarisation manipulation means for independently imparting a first controlled polarisation manipulation to the polarisation aligned optical signal so as to output a first polarisation manipulated optical signal having one of at least two distinguishable polarisation states including a first polarisation state and a second polarisation state; a first optical separation means for spatially separating a first selected optical signal from the series of optical signals when the polarisation state of the polarisation manipulated optical manipulated signal can be in a first polarisation state, thereby forming a first and second output optical signal, and maintaining the spatial alignment of the first selected optical signal with the series of optical signals when the polarisation manipulated optical signal can be in a second polarisation state so as to form a third optical output; a first reflection element, reflecting the first and third optical signal after they have passed through the first polarisation manipulation means; the reflection element reflecting the first and third optical signals towards a second polarisation manipulation means; a second polarisation manipulation means for independently imparting a second controlled polarisation manipulation to the first and third optical signals so as to output a second polarisation manipulated optical signal having one of at least two distinguishable polarisation states including a third polarisation state and a fourth polarisation state; a second optical separation means for spatially separating a second selected optical signal from the series of optical signals when the polarisation state of the second polarisation manipulated optical signal can be in a third polarisation state, thereby forming a forth and fifth output optical signal, and maintaining the spatial alignment of the second selected optical signal with the series of optical signals when the polarisation manipulated optical signal can be in a fourth polarisation state so as to form a sixth optical output.

Preferably, the device further includes a first orthogonal polarisation spatial separation element placed adjacent the first polarisation manipulation means for spatially separating any residual orthogonal component of the first and third optical signals. Preferably, the device also includes a second orthogonal polarization spatial separation element placed adjacent the second polarisation manipulation means for spatially separating any residual orthogonal component of the first and third optical signals. The residual orthogonal component can be monitored to provide operational information on the device. The first and second polarisation manipulation means can include portions formed as part of the same substrate of a liquid crystal device utilising different electrode pairs.

In accordance with a further aspect of the present invention, there is provided in a device for filtering at least a predetermined selected optical signal having a predetermined wavelength range from a series of optical signals, the device comprising: a polarisation alignment means for substantially aligning substantially orthogonal polarisation states of an optical input signal so as to produce a polarisation aligned optical signal; a polarisation manipulation means for imparting a controlled polarisation manipulation to the polarisation aligned optical signal so as to output a polarisation manipulated optical signal having one of at least two distinguishable polarisation states including a first polarisation state and a second polarisation state; and an optical separation means for spatially separating the selected optical signal from the series of optical signals when the polarisation state of the polarisation manipulated optical signal is in a first polarisation state, thereby forming a first and second output optical signal, and maintaining the spatial alignment of the selected optical signal with the series of optical signals when the polarisation manipulated optical signal is in a second polarisation state so as to form a third optical output; a method of operating the device as an add-drop multiplexer, the method comprising the steps of: (a) inputting optical input light as the optical input signal; (b) setting the polarisation manipulation means to the second polarisation state so as to maintain the spatial alignment of the selected optical signal with the series of optical signals; (c) tuning the optical separation means to select the predetermined wavelength range of operation; and (d) setting the polarisation manipulation means to the first polarisation state so as to spatially separate the first and second output optical signals.

The optical separation means preferably can include a liquid crystal Fabry-Perot etalon and the method further can comprise driving the etalon for rapid switching, the method further comprising the steps of iteratively: (a1) utilising an AC waveform of a first frequency and magnitude to drive the liquid crystal to a first polarisation rotation state; (b2) increasing the frequency of the AC waveforn to a second frequency to drive the liquid crystal to a second polarisation rotation state; (c3) decreasing the magnitude of the AC waveform to a low level whilst maintaining the second polarisation rotation state.

In accordance with a further aspect of the present invention, there is provided a method of driving a liquid crystal Fabry-Perot etalon for rapid switching, the method comprising the steps of iteratively: (a) utilising an AC waveform of a first frequency and magnitude to drive the liquid crystal to a first polarisation rotation state; (b) increasing the frequency of the AC waveform to a second frequency to drive the liquid crystal to a second polarisation rotation state; (c) decreasing the magnitude of the AC waveform to a low level whilst maintaining the second polarisation rotation state.

The device can also include a monitoring means for monitoring a residual signal transmitted through the optical separation means when the polarisation manipulated optical signal can be in a second polarisation state. The optical separation means preferably can include a liquid crystal Fabry-Perot etalon filter which further can comprise a first and second partially reflective substrate; a liquid crystal material interposed between the partially reflective substrates; an electric field generation means generating an electric field over the liquid crystal material; wherein the reflectivity of one of the substrates can be altered to differ from the other and the electric field can be manipulated so as to increase the transmission characteristics of the filter at a predetermined frequency.

The optical separation means preferably can include a liquid crystal Fabry-Perot etalon filter which further can comprise a first and second substrate; a liquid crystal material interposed between the reflective substrates; at least one transparent electrode affixed to the surface of at least the first substrate; and wherein the first substrate preferably can include a transparent material having a thermal conductivity substantially greater than glass. The substrate can be formed from sapphire or crystalline quartz.

The device preferably can include: at least one liquid crystal device having a liquid material suspended between a first and second substrate, with at least one substrate containing an electrode, the material altering first physical properties in accordance with an applied electric field; and high frequency alternating current application means for applying a high frequency alternating current to the at least one electrode, thereby heating the electrode and consequently heating the liquid material, the frequency being such that the first physical properties of the liquid material are preferably substantially unaffected by the high frequency alternating current.

The system can also include a lens array for focussing the light emitted from and transmitted to a series of input/output optical waveguides.

In accordance with a further aspect of the present invention, there is provided a method of heating a liquid material suspended between a first and second substrate, with at least one substrate containing an electrode, the material altering first physical properties in accordance with an applied electric field, the method comprising the step of:

applying a high frequency alternating current to the at least one electrode, thereby heating the electrode and consequently heating the liquid material, the frequency being such that the first physical properties of the liquid material are substantially unaffected by the high frequency alternating current.

The liquid material can comprise a liquid crystal material and the first physical properties can include an effective refractive index of light traversing the material. The electrode can be optically transparent and, in conjunction with a second electrode can be used to form an electric field across the liquid material. The at least one electrode can be formed from indium tin oxide (ITO) and the substrate further preferably can include a series of conductive metal lines attached to the transparent electrodes In accordance with a further aspect of the present invention, there is provided a telecommunication system including a device for filtering at least a predetermined selected optical signal having a predetermined wavelength range from a series of optical signals, the device comprising: a polarisation alignment means for substantially aligning substantially orthogonal polarisation states of an optical input signal so as to produce a polarisation aligned optical signal; a polarisation rotation means for imparting a controlled polarisation rotation to the polarisation aligned optical signal so as to output a polarisation rotated optical signal having one of at least two distinguishable polarisation states including a first polarisation state and a second polarisation state; and an optical separation means for spatially separating the selected optical signal from the series of optical signals when the polarisation state of the polarisation rotated optical signal is in a first polarisation state, thereby forming a first and second output optical signal, and maintaining the spatial alignment of the selected optical signal with the series of optical signals when the polarisation rotated optical signal is in a second polarisation state so as to form a third optical output.

BRIEF DESCRIPTION OF THE DRAWINGS

The preferred and other embodiments of the present invention will now be described with reference to the accompanying drawings in which:

FIG. 5 illustrates a first embodiment of the present invention;

FIG. 6 illustrates various polarisation states for the arrangement of FIG. 5;

FIG. 20 illustrates schematically a packaged arrangement of the preferred embodiment; and FIG. 21 illustrates the utilisation of the preferred embodiment in a telecommunications system.

DETAIL OF PREFERRED AND OTHER EMBODIMENTS

In the preferred embodiment a Fabry-Perot (FP) liquid crystal device is utilised to create a tunable add drop multiplexer arrangement. The Fabry-Perot cavity is filled with a nematic liquid crystal material.

It is known from the teachings of "Wavelength-selective filters for single-mode fiber WDM systems using Fabry-Perot interferometers" by Mallinson, published in Applied Optics, Vol 26, No. 3, (Feb. 1, 1987) at pages 430–436, U.S. Pat. No. 5,111,321 to Patel, entitled "Dual Polarisation Liquid Crystal Etalon Filter" (the contents of which are hereby incorporated by cross reference), U.S. Pat. No. 5,150,236 to Patel entitled "Tunable Liquid Crystal Etalon Filter" and the Journal of Light Wave Technology, Volume 11, number 12, December 1993 at pages 2033–2043 entitled "Tunable Liquid-Crystal Fabry-Perot Interferometer Filter For Wavelength Division Multiplexing Communication Systems", by Hirabayashi et. al, that liquid crystal Fabry-Perot Etalon filters provide a frequency variable filter for particular polarisation states. The variation in frequency is made dependent upon an electric field across the device. Further, the teaching of U.S. Reissue Pat. No. RE37,044 to Wu entitle "Tuneable Add Drop Filter" describes a tuneable add/drop multiplexer that combines a tunable filter and a non-reciprocal routing mechanism such as an optical circulator into a single component. However, the device disclosed by Wu is not able to be tuned without interrupting the other channels during setup.

Whilst the operation of a liquid crystal Fabry-Perot type filter is described in the aforementioned references, a short description of the operation will be given hereinafter.

Figure 1:
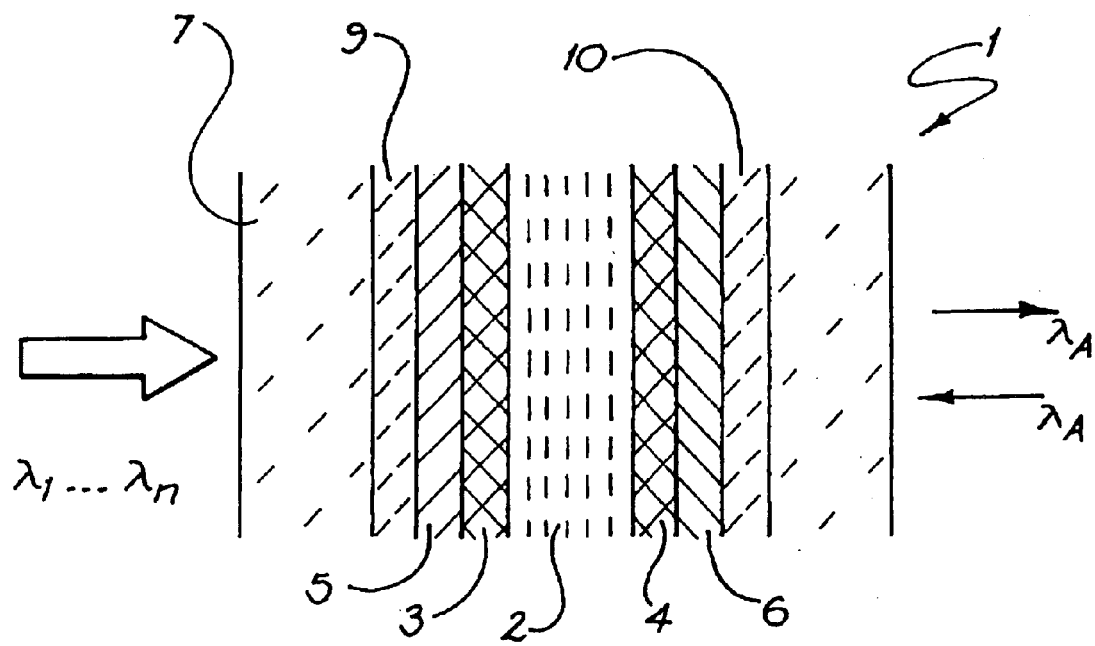
FIG. 1 illustrates a schematic sectional view of a liquid crystal Fabry-Perot filter device.

Turning initially to FIG. 1 of the drawings, there is illustrated a schematic sectional view through a liquid crystal etalon filter type device which is based around a liquid crystal filled Fabry-Perot cavity 2. The liquid crystal 2 is aligned in a known manner by alignment layers 3, 4. Dielectric film layers 5, 6 provide a high degree of reflectance of light within the cavity. The dielectric mirrors being ideally approximately 95% to 99% reflective. The dielectric mirrors 5, 6 are mounted on glass plates 7, 8 which hold the liquid crystal structure together. Two transparent electrodes 9, 10 made from Indium Tin Oxide (ITO) or the like are formed on the glass plates between the Dielectric film and the glass substrate.

Figure 2:
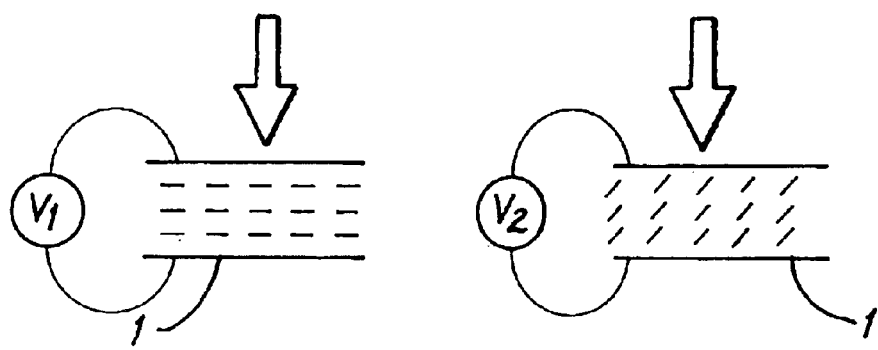
FIG. 2 illustrates schematically the operation of a liquid crystal device.
Figure 3:
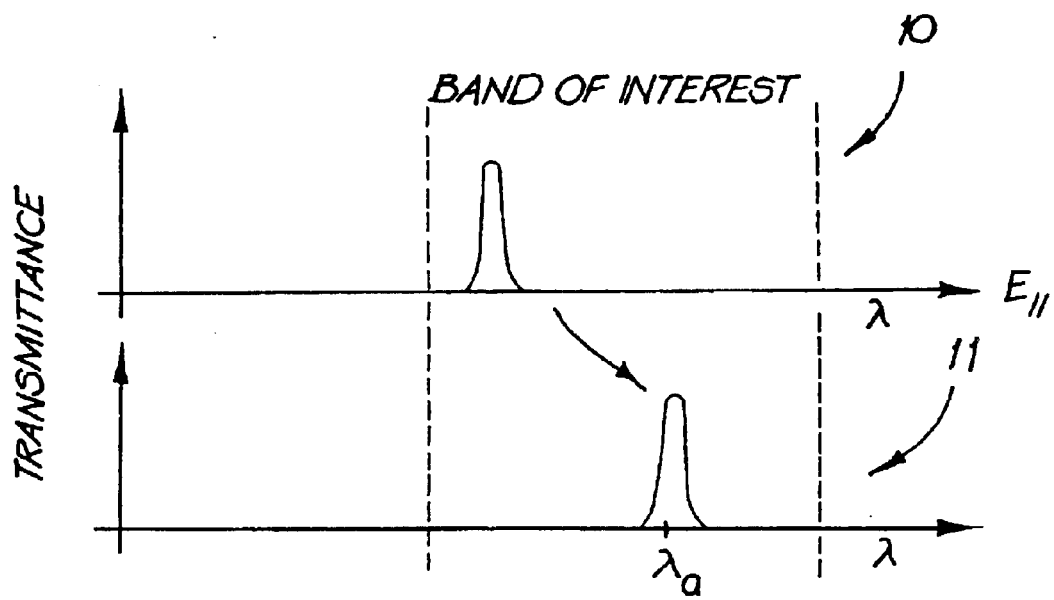
FIG. 3 illustrates the change transmittance of a liquid crystal device with changing electric field for a first polarisation state to FIG. 3.
Figure 4:
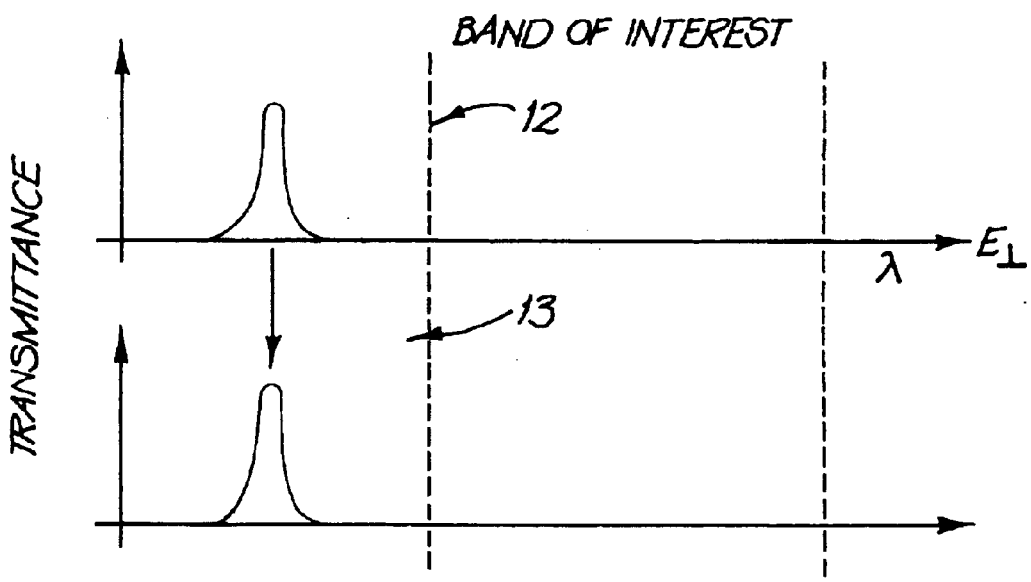
FIG. 4 illustrates the change in transmittance with change in electric field for an orthogonal polarisation state.

As taught by the aforementioned references, the liquid crystal 2 in an external electric field formed by electrodes 9, 10 undergoes a change in the effective refractive index for light polarised in the direction of a director n associated with the alignment of the liquid crystal molecules 2. The refractive index of the orthogonal polarisation state normally undergoes little effective change. Hence, as illustrated schematically in FIG. 2, when a voltage is applied across the device 1, depending upon the type of liquid crystal utilised, the liquid crystal molecules undergo a realignment resulting in a corresponding change in refractive index. The effect being to change the effective cavity length and hence to change the effective filtering characteristics for light having polarisation aligned with the liquid crystal director. The net result being as illustrated in FIG. 3 such that the transmittance 10 of the filter arrangement is effectively altered 11 in accordance with a change in the electric field associated with the device. As shown in FIG. 4, for polarisation states orthogonal to the direction of alignment, the transmission characteristics 12 remain effectively unchanged 13 for changes in voltage. Further, the arrangement of FIG. 1 is known to provide extremely good band pass characteristics.

Turning now to FIG. 5, there is shown schematically an initial design for a tunable wavelength or reconfigurable optical add drop multiplexer. In the design 20 there is provided an input fibre 21 which projects the input light onto a polarisation separator 22 which spatially separates the orthogonal polarisation states of the input light. The polarisation separator 22 can comprise a birefringent material such as a rutile crystal or the like.

Next, a polarisation equaliser 23 is provided. This can comprise a half way plate 24 for rotating one of the polarisation states through 90 degrees with a second dummy element 25 which can provide for no effect on the polarisation state. Next, a lens 27 collimates the light passing therethrough and can comprise a GRIN lens or the like. Alternatively, the polarisation alignment elements and the collimation elements can be swapped in position. A further liquid crystal element 28 is provided having an optical axis set at 45 degrees to the input polarisation. Hence, the element 28 provides a variable polarisation retardation of the input light in accordance with an external electrical control. Next, a quarter wave plate 26 is provided with its optical axis set at 45 degrees to the axis of element 28. The two elements 26 and 28 combine to provide for a controlled rotation of the polarisation state of input light.

Next, a Fabry-Perot liquid crystal device 29 is provided which operates in accordance with the previous explanation of FIG. 1, to filter the desired wavelength output from liquid crystal polarisation rotator 28.

Turning now to FIG. 6, there is shown a series of polarisation state indicators for the light as it traverses the arrangement 20. Initially, the polarisation states are spatially coalesced 31. After passing through walkoff crystal 22, the polarisation states are separated 32. Next, polarisation equalising element 23 aligns the polarisation states 33. The lens 29 has no effect 34 on the polarisation states. The liquid crystal device 28 and quarter wave plate 26 together provide for a controllable rotation of the polarisation states 36. Hence, the input to the Fabry-Perot element 29 is the aligned polarisation states 36 having a controllable rotation. The light reflected on the return path from the Fabry-Perot element 29 follows the polarisation states 40 to 45, to be output at fiber 30.

The arrangement 20 is able to provide for a tunable optical add drop multiplexer. This can be achieved via the following steps:

1. Initially, set the electric field of the liquid crystal element 28 to provide, in combination with quarter wave plate 26, an effective zero degree rotation of the polarisation state so that the resultant arrangement 29 acts in accordance with FIG. 4 so as to provide for the passage of frequencies which are determined to be out of the band of interest.

2. The Fabry-Perot system 29 is then tuned to a desired frequency for output: $\lambda_a$.

3. Next, the liquid crystal element 28 is again activated so as to provide for filter transmission of the particular wavelength $\lambda_a$ of interest.

Hence, the arrangement of FIG. 5 can provide for a tunable band pass add drop multiplexer. Further, the ability to turn on and off the projection of light through the device 20 provides for tunability across multiple channels with minimal interference or blocking occurring in the intermediate channels during the tuning process. This provides an added significant advantage of operation.

Figure 7:
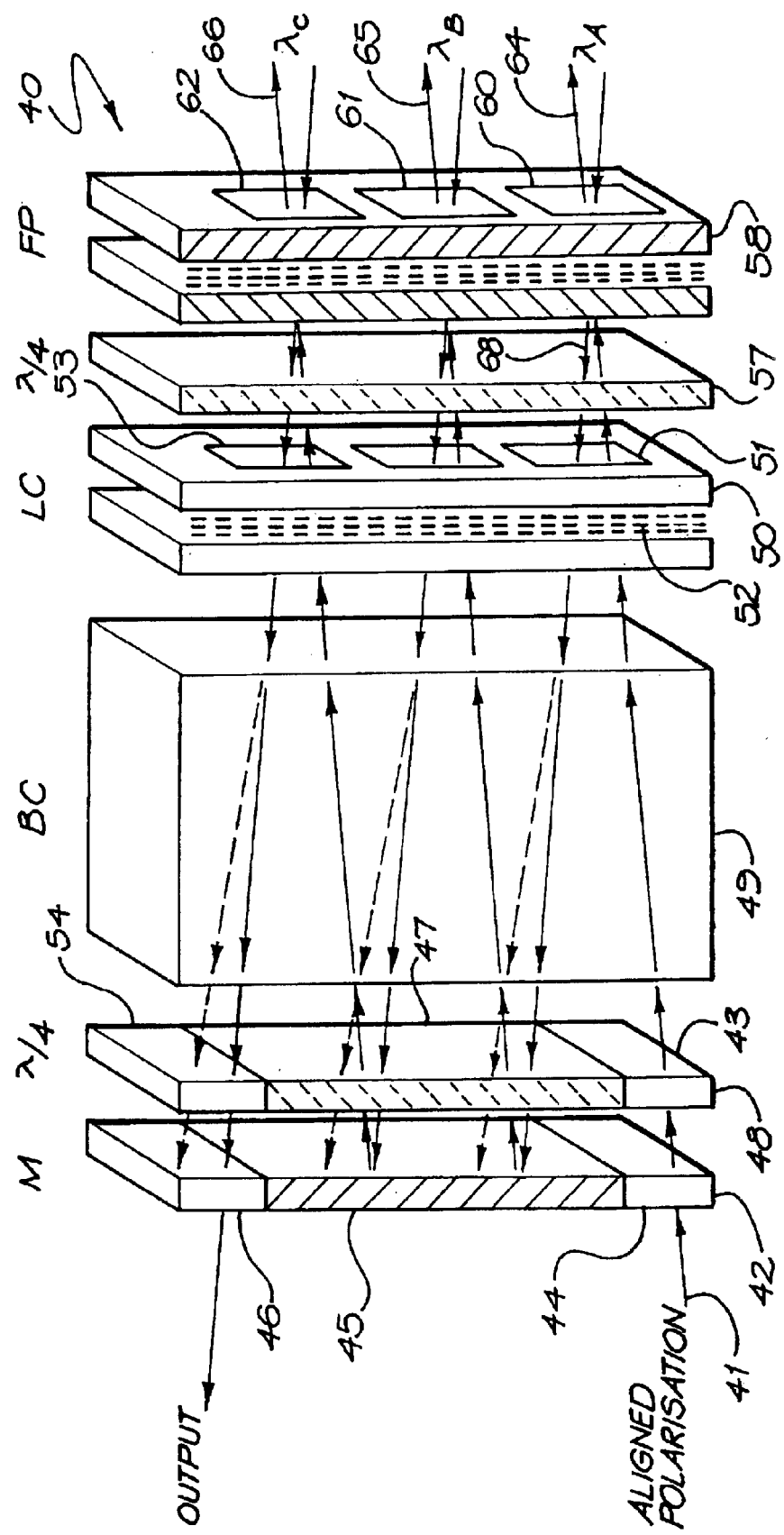
FIG. 7 illustrates a modified embodiment of the present invention.

Turning now to FIG. 7, a further alternative arrangement 40 is illustrated. This arrangement provides for simultaneous multi channel demultiplexing. In this arrangement, aligned polarisation states are input 41 (the alignment can take place by means of elements 22, 23 of FIG. 5 preferably positioned in the expanded beam). The arrangement 40 includes the following elements:

Firstly, a first mirror element 42 which provides for selective reflection of light and includes a first transparent component 44, a reflective component 45 and a second transparent component 46.

Next, a quarter wave plate element 48 is provided which provides for a 90 degree rotation of the input light after a reflected double pass. The element again includes a transparent portion 43, a quarter wave element 47 and a further transparent portion 54.

Next, a birefringent crystal 49 is provided to spatially separate orthogonal polarisation states traversing the crystal 49 thereby 'purifying' the signal as will be discussed in more detail hereinafter.

Next, a liquid crystal retarder 50 is provided. The retarder 50 provides for a variable rotation of the input light in accordance with the electric field on the electrodes. Preferably, a series of electrode plates 52–53 (including matching electrodes—not shown) are separately controllable to activate portions of the device on demand.

Next, a quarter wave plate 57 is provided which provides for a controlled polarisation rotation of light in conjunction with element 50.

Next, a Fabry-Perot type filter 58 is provided for selectively filtering particular wavelengths for output. Again, the filter 58 is constructed with a series of electrodes 60–62 which provide for separate control of the electric field across the Fabry-Perot filter and thereby selectively control the output frequencies 64–66.

Figure 8:
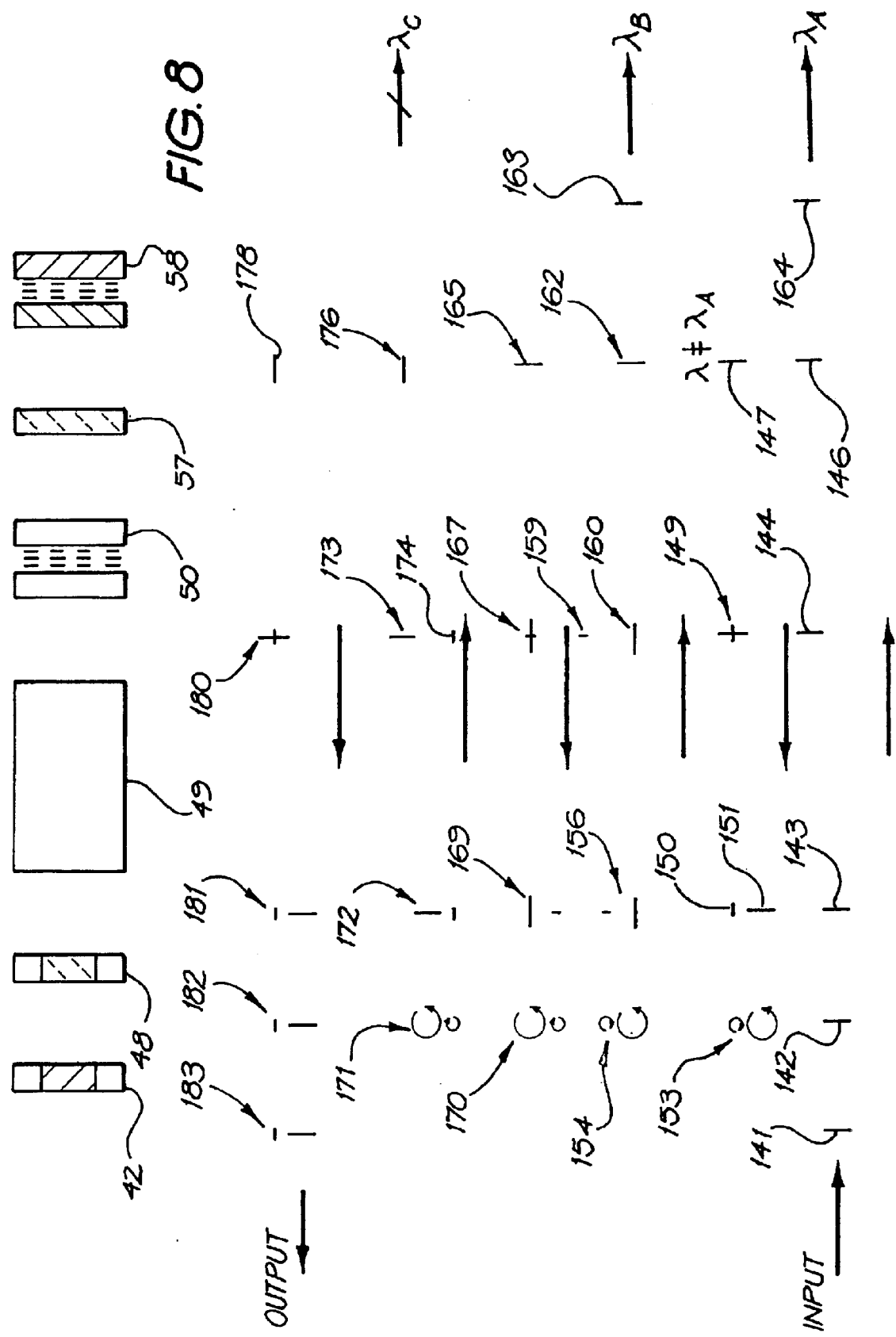
FIG. 8 illustrates various polarisation states for the arrangement of FIG. 7.

The input light is offset an angle θ from the horizontal and its progression through the device will now be described with reference to both FIG. 7 and FIG. 8, with FIG. 8 showing a series of polarisation state transitions for the light. The transitions are shown for the case where $\lambda_A$ and $\lambda_B$ are dropped with $\lambda_C$ continuing unaffected.

The input light 41 is initially of an aligned polarisation 141 (having been aligned by an arrangement such as that shown in FIG. 5). Upon passing through the mirror element 42, no change in the alignment state 142 occurs. Further the transparent bottom portion 43 of the quarter wave plate element 48 also has no affect. The birefringent element 49 has its optical axis of translation set in the perpendicular direction to the polarisation state 143 and hence has no affect on the polarisation state 144. The first liquid crystal device 50 in conjunction with quarter wave plate 57 rotates the polarisation state 146 between zero and 90° depending upon the state of an external electric field set by the electrode 51. Next, depending on the state of polarisation 146, utilising the methodology described previously with reference to FIGS. 5 and 6, the desired wavelength $\lambda_A$ is extracted 164. The polarisation states 141–164 operating substantially in the same manner as that discussed with reference to FIG. 6.

The light reflected in the return path from device 58 (68 of FIG. 7) will have a polarisation state 147 determined by the polarisation states 146. The polarisation state 147 is rotated 149 by quarter wave plate 57 and the liquid crystal rotator 50. This reverses the rotation previously supplied so as to output polarisation state 149.

The two elements 50, 58 may operate in a non perfect nature. The polarisation state 149 can include a major component associated with idealised operation in addition to a minor orthogonal component due to imperfect operation.

Next, the birefringent crystal 49 spatially separates the polarisation state into two components 150, 151. The quarter wave plate 48 then translates the two polarisation states to produce the elliptical polarisation states 153. The mirror 42 then reflects the polarisation states 154. Next, the quarter wave plate 48 transforms the polarisation states to 156 which are then further separated 159 and 160 by the birefringent plate 49. At this stage, the polarisation state 159 is sufficiently spatially separated so that it can be neglected from further discussions. The translation of the minor component 159 results in a general 'cleaning up' of the signal.

The remaining polarised light 160 goes through a series of polarisation state transformations 162–163, 165–167 which are very similar to the transformations 144, 146, 147, 149 and 163 previously discussed. However whereas the electrode 51 was set so that elements 50 and 57 provide for an equivalent 0 degree rotation, the electrode 52 is set so that elements 50 and 57 provide for an equivalent 90 degree rotation (e.g. rotation 160 to 162). Turning to FIG. 7, the separated electrodes eg 52, 65 allow for independent control of the switching of the output $\lambda_B$ from the output $\lambda_A$.

Again the return output 167 comprises a dominant polarisation component and a minor secondary orthogonal polarisation component. The components 167 undergo further transformations 169–173 which are similar to the transformations 150–160. Again, the polarisation states 173, 174 are sufficiently separated to neglect the minor orthogonal portion 174. The remaining component 173 again undergoes polarisation manipulations 176, 178, 180 which are again similar to the manipulations 144–149. However this time, due to the independently charged electrodes 53, 62, the output $\lambda_C$ can be independently controlled so that $\lambda_C$ is not dropped or added. This can be achieved by providing for an effective 90 degree rotation of the polarization state by electrode 53 of FIG. 7.

The light at polarisation state 180 then traverses the birefringent crystal 49 separating the polarisation states 181 which then pass through the transparent portion 54 and through the transparent portion 46 of the element 42 (FIG. 7).

The arrangement of FIG. 7 thereby provides for multiple independent add drop capabilities.

The arrangement of FIG. 7, through the addition of the birefringent crystal 49, also provides for a clean up affect of the input signals. It has been found in practice that the reflected output from the Fabry-Perot type filter, whilst being predominantly of one polarisation state, may contain small components of the orthogonal polarisation state. This may be a result of the liquid crystal polarisation manipulation carried out by components being non-exact. For example, the components are often found to contain a wavelength dependence of operation. The inclusion of the birefringent walk off plate 49 is designed to spatially separate the polarisation states with the unwanted polarisation state being walked off and the resultant polarisation being further processed. Each of the polarisation states is rotated and reflected by mirror 45 to again be further separated by the birefringent plate upon return. The two return polarisations again impinge upon the Fabry-Perot liquid crystal cavity 58 thereby outputting other wavelengths.

Again, the switching principals aforementioned in FIG. 3 and FIG. 4 can be utilised to tune the Fabry-Perot liquid crystal display element 58 so as to tune the desired output frequencies $\lambda_A$ $\lambda_B$ and $\lambda_C$.

Depending on the type of liquid crystal utilised, various driving schemes are possible. It is common to drive nematic liquid crystals in a polarisation varying state utilising an AC type waveform having frequencies in the low kilohertz to avoid ion migration within the liquid crystal material. Ion migration can result in the build-up of charges in the liquid crystal cell layers which can hinder director reorientation.

Figure 9:
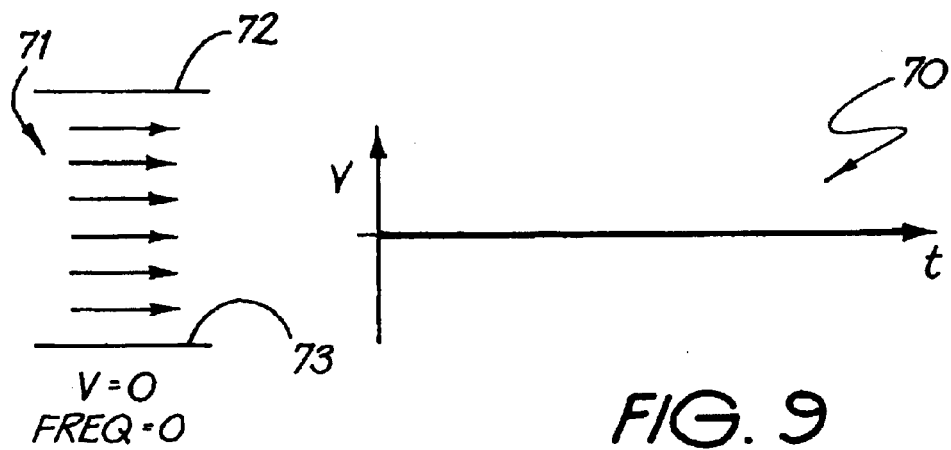
FIG. 9 to FIG. 11 illustrates a timing scheme utilised with an embodiment of the invention.
Figure 10:
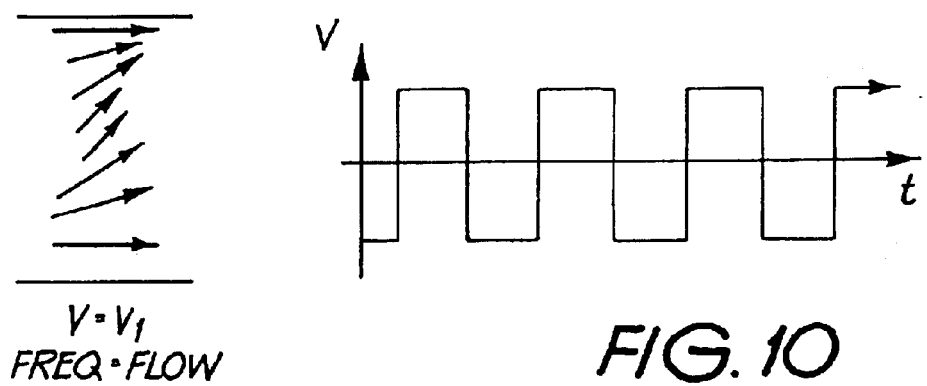

Initially, as shown in FIG. 9, a zero voltage 70 is provided. The zero voltage has no effect on the homogeneous (parallel) alignment 71 of the liquid crystals molecules between the plates 72, 73. When an electric field is applied between the electrodes as shown in FIG. 10, the liquid crystal molecules tend to align with the electric field. The point at which the electric field overcomes the orientation produced by the surface anchoring is know as the Freedericksz transition and simply defines the point when the liquid crystal director changes its orientation from one molecule to the next. As the AC voltage is increased, the director continues to align with the field until most of the molecules are parallel with the field.

For liquid crystal variable retarder 28, the zero voltage state produces a maximum retardation for light polarised at 45 degrees to the liquid crystal director. The amount of retardation for the zero voltage case is given by the thickness of the liquid crystal variable retarder cell and the birefringence of the material. As the voltage is increased, the director tends to align with the field producing less retardation until close to no retardation is observed for maximum field strength.

As discussed previously with reference to FIG. 3 and FIG. 4, for liquid crystal Fabry-Perot element 29, varying the electric field will change the effective refractive index of the liquid crystals material for light polarised parallel to the director, which appears as a change in the optical path length of the Fabry-Ferot cavity and therefore a change in the wavelength of the light transmitted by the filter. Light polarised perpendicular to the director will see no change in refractive index.

Unfortunately, the most desirable form of liquid crystal, nematic liquid crystal has an excessive relaxation time to return to its initial state. Whilst the time for switching from a rest state to a reoriented state is rapid, the time to reverse this process is often excessive and can take many milliseconds.

In the preferred embodiment, a unique driving scheme is utilised to enhance the responsiveness of switching of the liquid crystal devices. Firstly, the transient nematic effect is utilised to increase the switching time for small changes in director reorientation. For example, see "High-speed liquid-crystal modulators using transient nematic effect" by Wu et. al., Applied Physics, volume 65, 1989, and U.S. Pat. No. 5,568,286 to Riza entitled "Fast liquid crystal switching unit". Secondly, in order to increase the time for the director to return to its initial state a dual frequency drive scheme can be utilised. For example, see "On the Use of Dual Frequency Nematic Material for Adaptive Optic Systems: First Results of a Closed—Loop Experiment" by Restaino et. al., Optics Express, volume 6, number 1, 3 Jan. 2000, and U.S. Pat. No. 4,927,242 to Aoki et. al. entitled "Dual Frequency Optically Active Liquid Crystal Cell".

The transient nematic effect driving scheme involves maintaining a relatively high AC voltage across the liquid crystal cell until the required director orientation is achieved. The AC drive voltage is then reduced to the level needed to hold the director orientation. Similarly when attempting to increase the time for the director to fall to the desired orientation, (reduction in voltage), the AC drive voltage is initially set to zero until the director is aligned as required. This method provides some improvement in response time especially when attempting to change the director orientation by very little.

Figure 11:
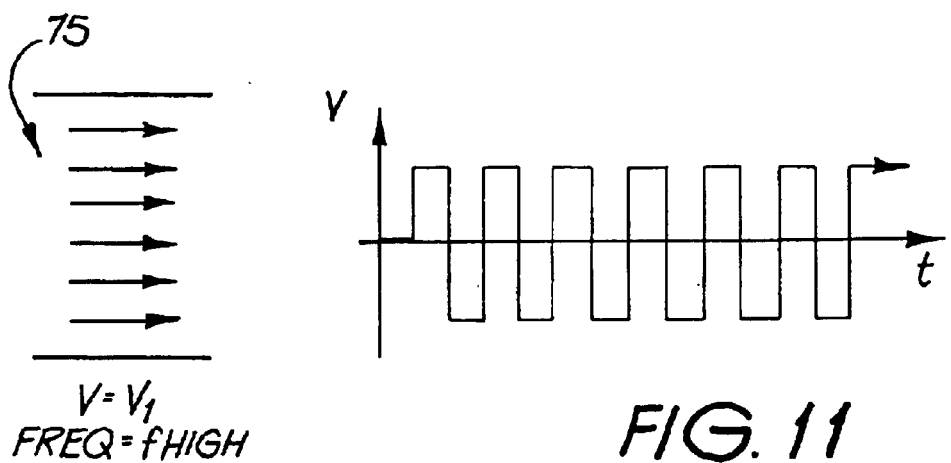

Turning now to FIG. 9 through FIG. 11, the dual frequency drive scheme will be discussed. Starting with FIG. 9 (zero voltage) and FIG. 10 (high AC drive voltage), discussed previously, the director orientation is changed by applying a field between the plates. To increase the time for the relaxation of the molecules back to their rest state, the dual frequency behaviour which most nematic liquid crystal materials exhibit can be utilised. Dual frequency behaviour refers to the ability of the liquid crystal material to change the sign of the dielectric anisotropy when the frequency of the AC drive voltage is increased beyond the cross over frequency of the particular material. When the sign of the dielectric anisotropy changes with the high frequency AC waveform, the director is forced to return to its initial homogeneous (parallel) alignment 75 with the plates as shown in FIG. 10. Thus by increasing the frequency of the AC drive waveform, beyond the crossover frequency, the liquid crystal director orientation can be forced to fall reducing the response time of the liquid crystal device.

Returning again to FIG. 7, the embodiment illustrated has the added advantage that it can also function as a monitoring system. The monitoring system can take advantage of the non-perfect operational nature of the Fabry-Perot device 58 and the Liquid Crystal device 50. The portion of the polarisation state e.g. 69 walked off by birefringent crystal 49 can be fed to a photodetector device for measurement.

Figure 12:
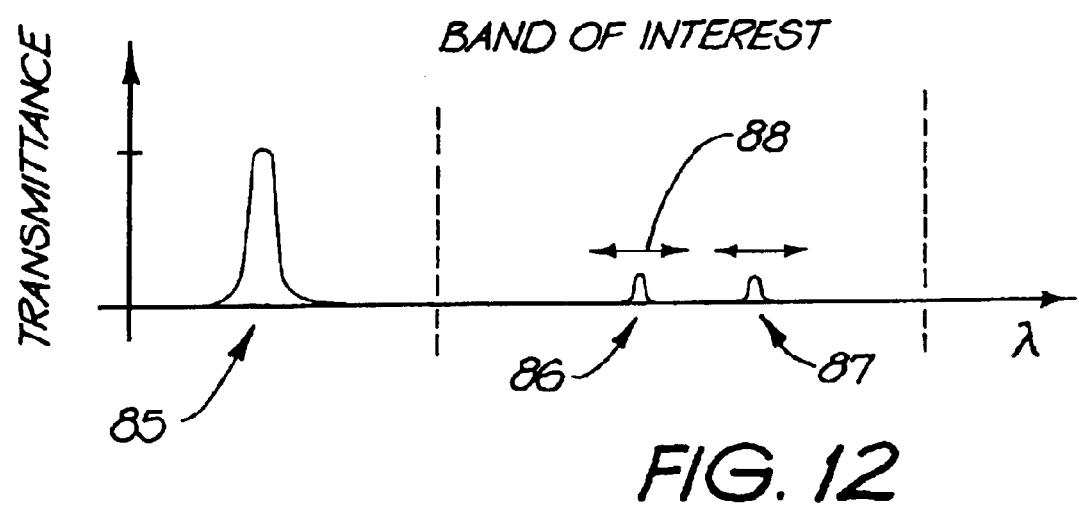
FIG. 12 illustrates utilising the preferred embodiment as a monitoring system.

Alternatively, when the arrangement 40 is in the non operating state, a small amount of leakage of light due to the non perfect polarisation rotation of units 50, 58 will be present. This situation is illustrated in FIG. 12 wherein the arrangement 40 provides for the substantial transmission 85 of the out of frequency band. However, a small amount of leakage 86, 87 may be evident. Alternatively, the polarisation rotation can be controlled to provide for a small amount of leakage.

Hence, a monitoring system can be constructed to monitor each of the channels by sweeping 88 the electric field across a range of wavelengths and monitoring the intensity of the detected portions 86, 87.

Figure 13:
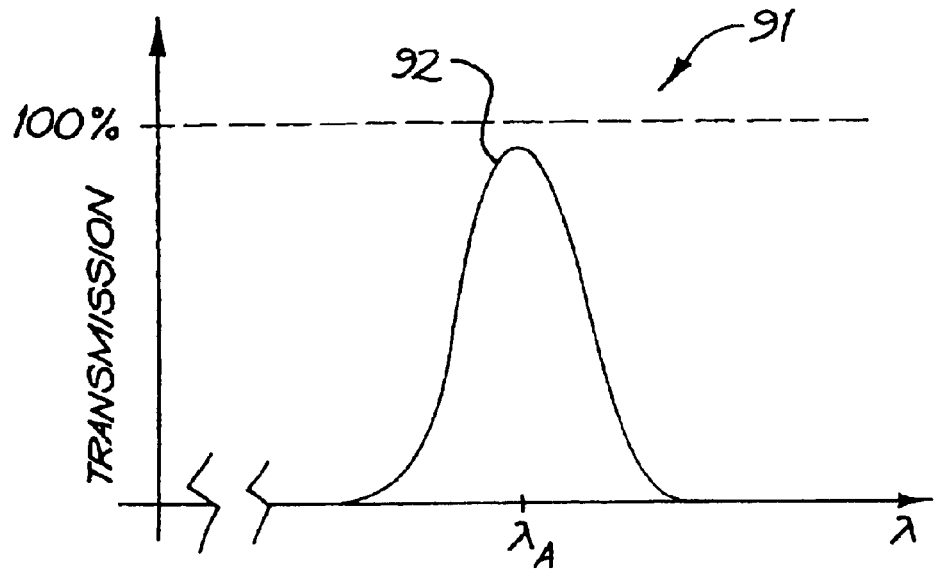
FIG. 13 illustrates the transmittance of a liquid crystal Fabry-Perot arrangement.
Figure 14:
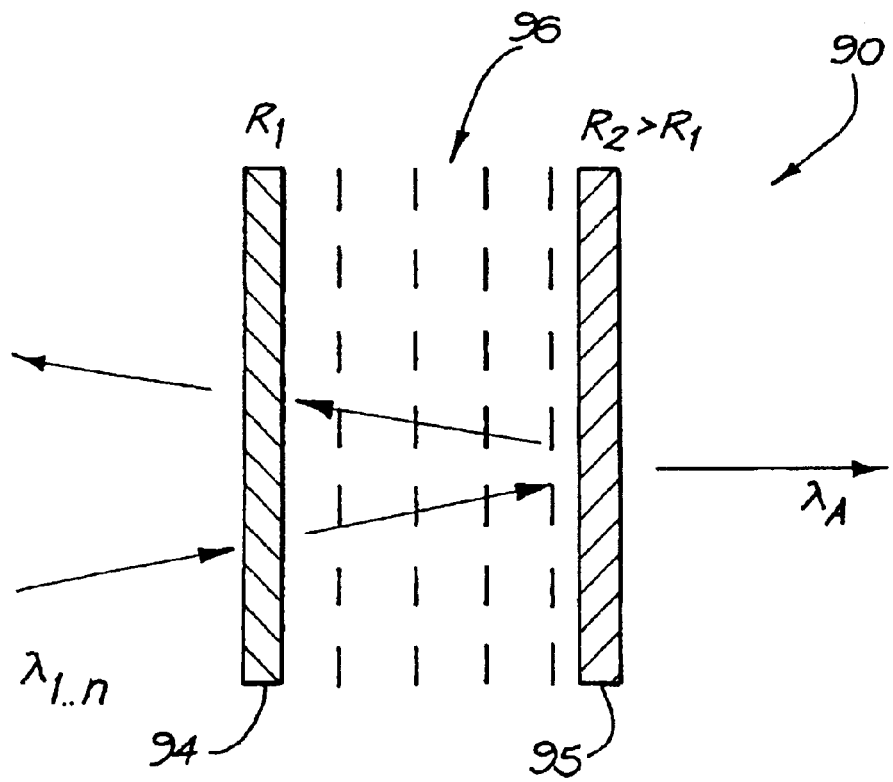
FIG. 14 illustrates schematically a first method for improving the transmission characteristics of a Fabry-Perot arrangement.

It is often important to ensure the best reflection suppression characteristics at the desired wavelength of the Fabry Perot type device. Unfortunately, as illustrated 91 in FIG. 13 the transmission peak 92 is non-ideal. The peak 92 is thought to approach the ideal transmission peak of 100% at $\lambda_A$ when the reflectors of the two ends of the cavity are accurately matched. This is shown in FIG. 14 for the liquid crystal Fabry-Perot device 90 having two near perfect mirror devices 94, 95 with the mirror 94 having a reflectivity R1 and the mirror 95 having a reflectivity R2. When the reflectivity is near equal, a strong resonant field is set up in the cavity 96. Normally, ideally, matching of the two reflectivities is desirable.

When absorption or scattering is present, the transmission is degraded and a reflection also occurs at the transmission peak. Suppression of this reflection is critical for low coherent crosstalk between the drop and add channels of an add/drop multiplexer. However, the utilisation of the liquid crystal device allows other processes to be applied to provide for suppressed reflection characteristics. In this arrangement, R2 can be made greater than R1. If the finesse of the cavity is able to be controlled then there will be a given resonance condition where: internal intensity×(1−R1)=R1×incident intensity. At that finesse at the central wavelength the reflected light will be effectively suppressed through destructive interference. An electric field gradient can be applied to the cavity to degrade the resonance properties to this point. In practice the reflected light can be monitored and a gradient applied until the reflection is minimised. Alternatively, instead of or as well as electric field adjustment, the polarisation incident to the Fabry Perot can be adjusted such that the reflected light is orthogonal to the polarisation of the express path and so suppresses the coherent interference. This can be achieved through controlling liquid crystal 28 whilst monitoring the express channel leaked power at the drop wavelength.

Figure 15:
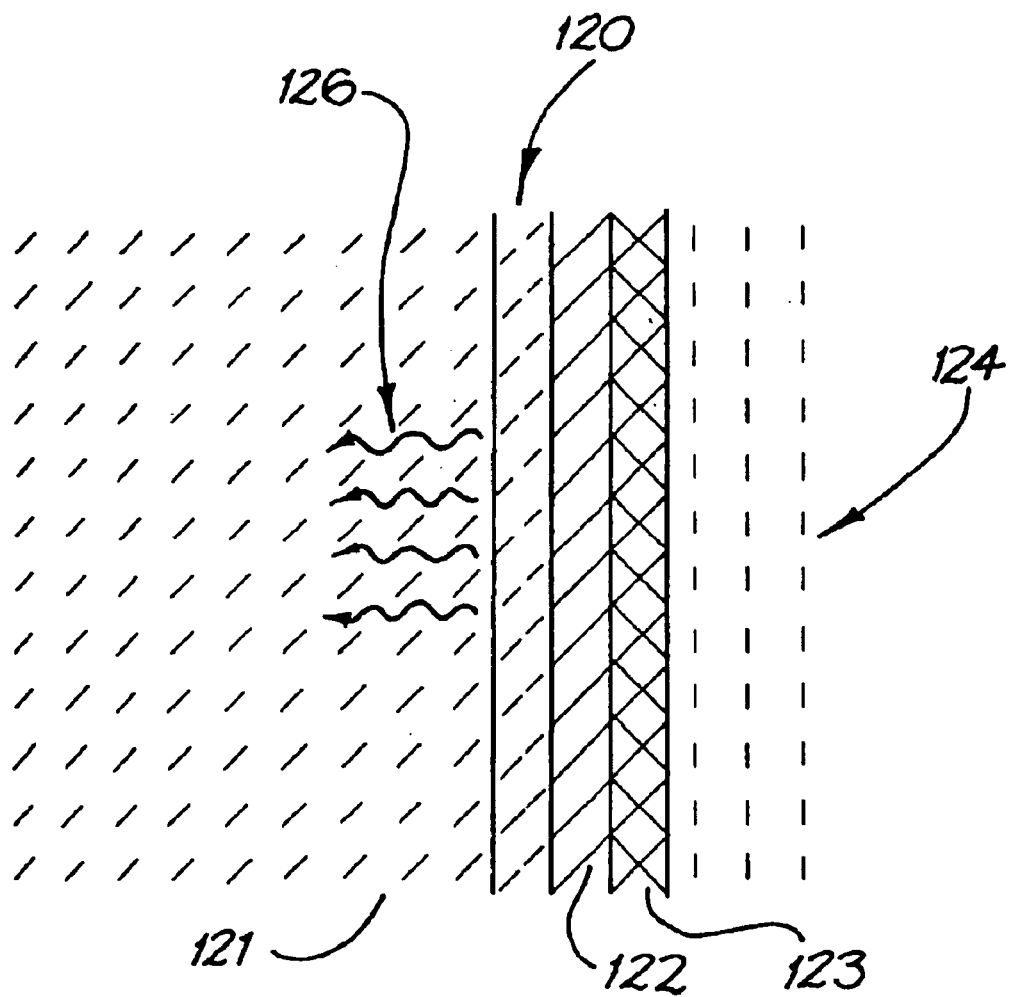
FIG. 15 illustrates the utilisation of a sapphire block to reduce the effects of non-linear heating of a liquid crystal device.

Further refinements are possible. For example, it has been found that, in practice, the utilisation of Indium Tin Oxide (ITO) electrodes can lead to localised heating of the liquid crystal. This again can lead to a reduction in the transmission properties of the Fabry-Perot cavity. The localised heating process is illustrated in FIG. 15 which is a sectional view through a portion of a liquid crystal display. Localised heating of the ITO layer 120 is transmitted 126 through the substrate 121 and dielectric and alignment films 122, 123 to the liquid crystal 124. The localised heating leads to non-uniformities of operation. The localised heating can be reduced through the utilisation of a thermally conductive, optically transparent substrate block formed from, for example, sapphire, crystalline quartz. Such an arrangement is illustrated in FIG. 15 wherein the sapphire block 121 is used to deposit the ITO surface 120. The sapphire block, having a high thermal conductivity, results in substantial amounts of heat 126 being drawn away from the liquid crystal 120 thereby reducing the non linear operation of the device.

Normally, it is desirable to operate liquid crystal devices at a high a rate as possible. Often, the liquid crystal material reacts faster at elevated temperatures. This property is well known in the field of liquid crystal display manufacture and is often utilised in display devices to increase the rate of operation. Hence, the liquid crystal material can be maintained at an elevated constant temperature (say 60 degrees Celsius) to maintain a certain speed of operation and stability. This is often achieved by adding a separate transparent electrode for resistive heating on one side of the substrate. Unfortunately, an extra ITO electrode on the substrate will lead to performance degradation due to optical absorption by the extra electrode surface.

Where it is desired to provide for elevated temperatures of operation of the liquid crystal devices, in the preferred embodiment, a high frequency alternating current is applied to one of the electrodes so as to provide for electrode heating. The high frequency AC current (in vicinity of 10 megahertz) applied across a ground electrode of liquid crystal. The AC high frequency contributes to heating of the ITO electrode and thereby heating of the liquid crystal. The frequency is sufficiently high that the liquid crystal material is not able to respond to the transient voltage and so the average DC voltage is zero and the liquid crystal operation is unaffected.

Figure 16:
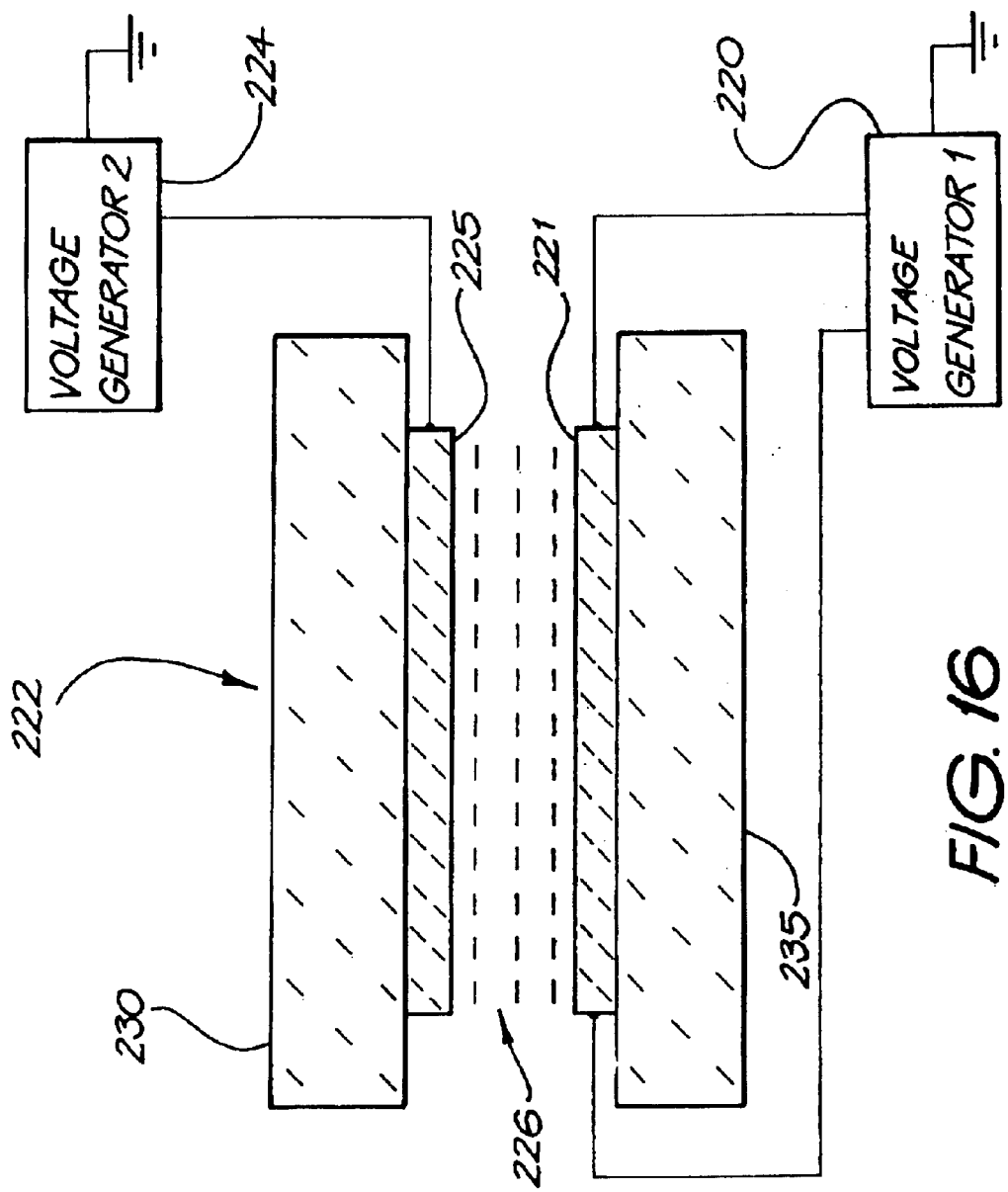
FIG. 16 is a schematic illustration of the process of high frequency heating of an electrode.

A suitable arrangement is illustrated in FIG. 16 wherein a first voltage generator 220 is connected across the electrode 221 of a liquid crystal display device 222. The voltage generator 220 provides for a high frequency signal which has the net effect of heating the ITO layer 221 and consequentially heating the liquid crystal material 226. A second voltage generator 224 is connected across the electrode 225. This electrode 225 is imparted with a control signal as discussed previously with reference to FIG. 9 to FIG. 11. As the voltage generator 220 provides a voltage oscillating at a higher frequency around zero volts, the electrode 221 acts as a ground plane when seen by the electrode 225. Hence, the liquid crystal material 226 located between the two electrodes 221, 225 reacts in accordance with the voltage on electrode 225.

Figure 17:
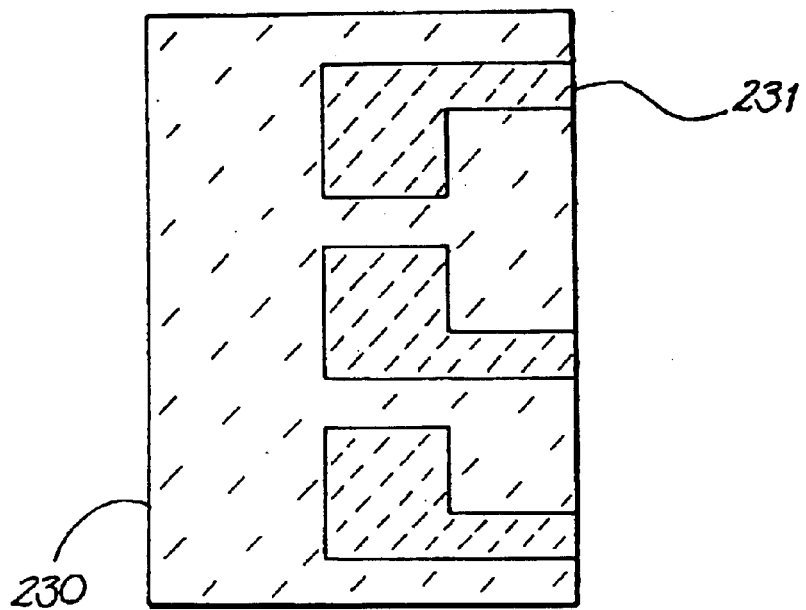
FIG. 17 and FIG. 18 are plan views of a liquid crystal substrate showing the electrodes.
Figure 18:
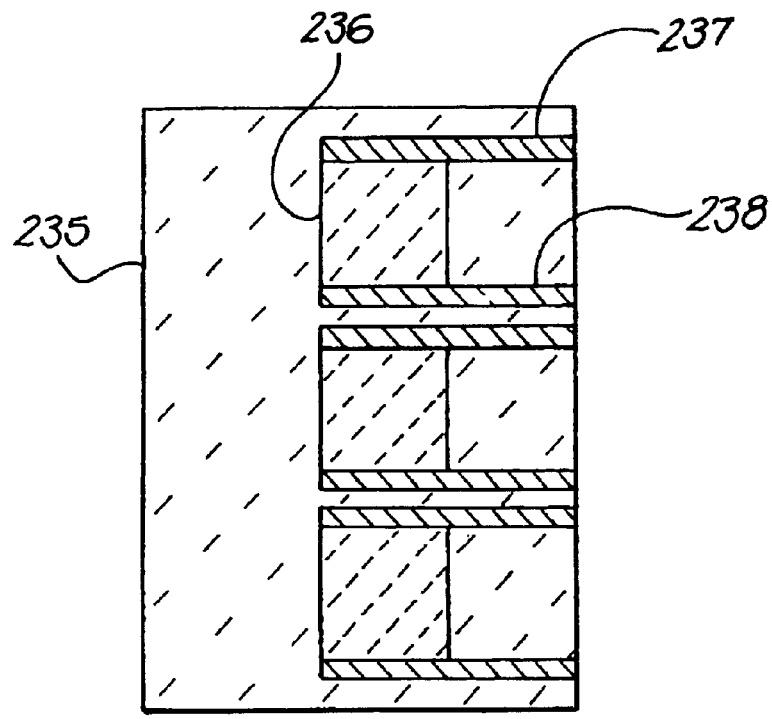
Figure 19:
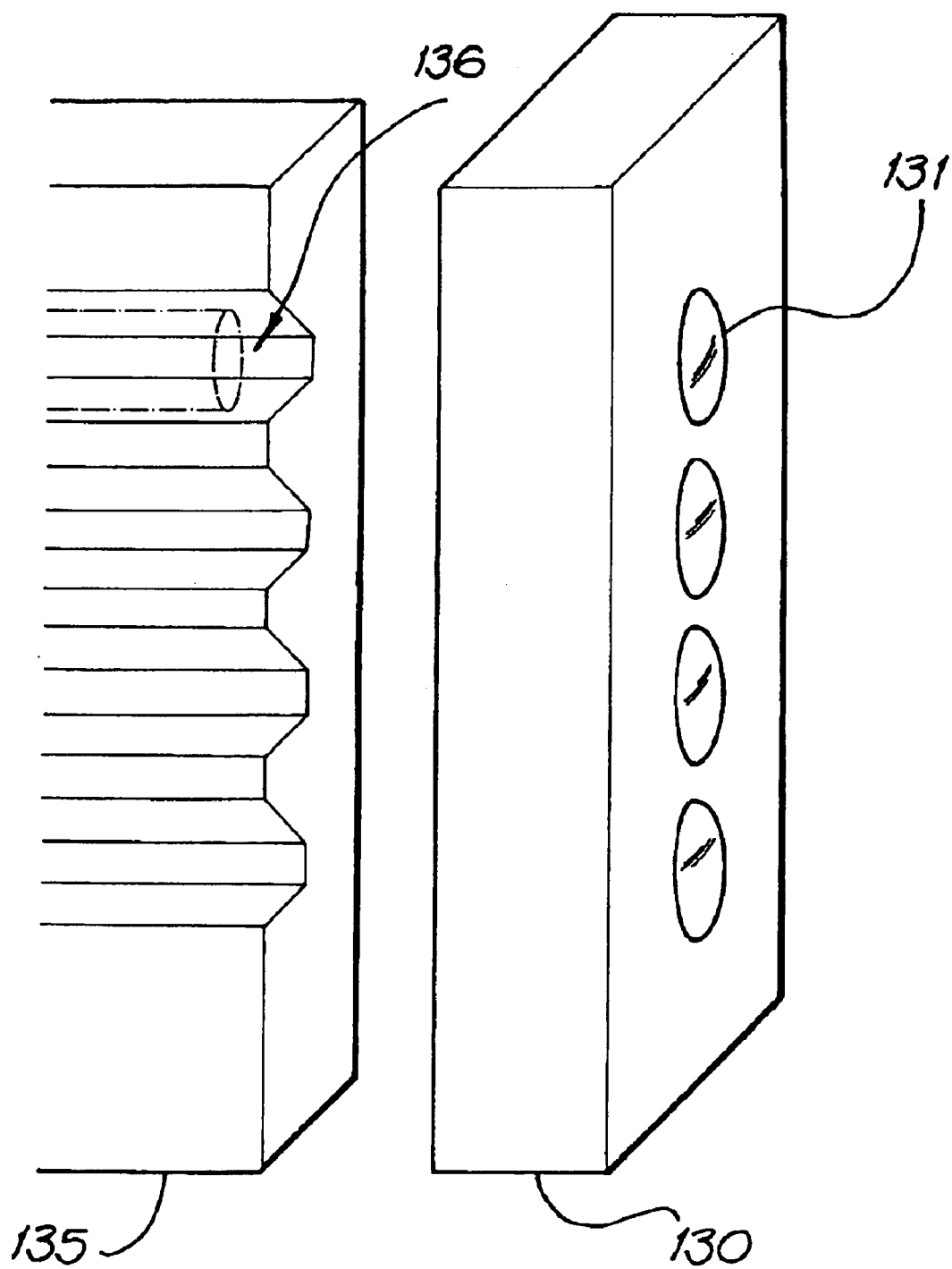
FIG. 19 illustrates a micro lensing arrangement utilised with an embodiment.

Turning to FIG. 17, there is shown schematically an example layout of the top substrate 230. The substrate 230 includes an ITO layer 231 which is interconnected to a second voltage generator. In FIG. 18, there is illustrated the bottom substrate 235 where each ITO portion 236 is interconnected to corresponding metal portions e.g. 237, 238. The metal portions 237, 238 act to carry current in a low resistive manner to the ITO 236 which is heated by the high frequency AC wave form generated by frequency voltage generator 220.

Further design optimisations are possible. For example, in the arrangement of FIG. 5, a lensing optimisation can be provided before the birefringent plate 22. The lensing arrangement can be adapted to operate with a series of fibres in accordance with the requirements. For example, turning to FIG. 16, there is illustrated a lensing array 130 which consists of a series of micro formed lensing elements 131 formed within an optically transparent block. Further, the optical block 130 is designed to mate with a fibre carriage unit 135 which contains a series of predefined slots e.g., 136 which are designed to hold fibres (one shown in phantom) within them.

It will be evident to those skilled in the art that the preferred embodiment provides for a tunable wavelength multiplexer. This is illustrated schematically in FIG. 20 wherein a wavelength multiplexer 200 is provided in which multiple input wavelength channels are transmitted along optical fiber 201. These are mixed with added channels 202 utilising the device of the preferred embodiment so as to provide for multiple output wavelength channels on output 203. The arrangement in FIG. 20 can be utilised in an optical fibre telecommunication system such as that illustrated 210 in FIG. 21 wherein multiple stations 211–213 are interconnected by an optical fibre channel for the transmission of information.

It will also be evident to those skilled in the art that various elements can be functionally substituted in the design of the preferred embodiment. For example, in the arrangement of FIG. 5, the liquid crystal element 28 and quarter wave plate 26 can be substituted by a variable Faraday rotator and suitable reciprocal rotator for predetermined alignments of input polarisations.

Other modifications are possible. For example, in one non-optimal arrangement, the parts, instead of being reused can be separately provided or replicated.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

We claim:

1. A device for filtering at least a predetermined selected optical signal having a predetermined wavelength range from a series of optical signals, the device comprising:

a polarisation alignment means for substantially aligning substantially orthogonal polarisation states of an optical input signal so as to produce a polarisation aligned optical signal;

a polarisation manipulation means for imparting a controlled polarisation manipulation to said polarisation aligned optical signal so as to output a polarisation manipulated optical signal having one of at least two distinguishable polarisation states including a first polarisation state and a second polarisation state;

an optical separation means tunable liquid crystal etalon filter having a tunable separation wavelength for spatially separating the selected optical signal from said series of optical signals when the polarisation state of the polarisation manipulated optical signal is in a first polarisation state, thereby forming a first and second output optical signal, and maintaining the spatial alignment of said selected optical signal with said series of optical signals when the polarisation manipulated optical signal is in a second polarisation state so as to form a third optical output.

2. A device as claimed in claim 1 wherein said etalon filter transmits the selected optical signal when the polarization state of the second optical signal is in said first polarization state and reflects the selected optical signal when the polarization state of the second optical signal is in the second distinguishable state.

3. A device as claimed in claim 1 wherein said liquid crystal Fabry-Perot etalon filter further comprises:

a first and second partially reflective substrate; a liquid crystal material interposed between the partially reflective substrates;

an electric field generation means generating an electric field over the liquid crystal material; wherein the reflectivity of one of the substrates is altered to differ from the other and the electric field is manipulated so as to increase the transmission characteristics of the filter at a predetermined frequency.

4. A device as claimed in claim 1 wherein said liquid crystal Fabry-Perot etalon filter further comprises:

a first and second substrate;

a liquid crystal material interposed between the reflective substrates;

at least one transparent electrode affixed to the surface of at least the first substrate; and wherein said first substrate includes a transparent material having a thermal conductivity substantially greater than glass.

5. A device as claimed in claim 4 wherein the substrate is formed from sapphire or crystalline quartz.

6. A device as claimed in claim 1 wherein said liquid crystal Fabry-Perot etalon filter includes:
- a liquid material suspended between a first and second substrate, with at least one substrate containing an electrode, said material altering first physical properties in accordance with an applied electric field; and
- high frequency alternating current application means for applying a high frequency alternating current to said at least one electrode, thereby healing the electrode and consequently heating the liquid material, said frequency being such that the first physical properties of said liquid material are substantially unaffected by said high frequency alternating current.

7. A device for filtering at least a predetermined selected optical signal having a predetermined wavelength range from a series of optical signals, the device comprising:
- first and second input/output optical waveguides;
- a first birefringent crystal adjacent said first end second optical waveguides for spatial separation of orthogonal polarizations;
- a first polarization rotation element adjacent said birefringent crystal for rotating one of the orthogonal polarizations so as to produce an aligned polarization output;
- first variable polarization manipulation means adjacent said first polarization rotation element for manipulating said aligned polarization output in a controlled manner so as to produce a rotated polarization output; and
- a tunable Fabry Perot etalon liquid crystal filter adjacent said first variable polarization manipulation means for filtering a tunable wavelength from said rotated polarization output and reflecting other wavelengths back through said first variable polarization manipulation means, said first polarization rotation elements, said first birefringent crystal element to said second optical waveguide.

8. A device as claimed in claim 7 wherein said device farther includes a focusing means for focusing the light emitted from said waveguides.

9. A device for filtering a series of predetermined selected optical signals having predetermined wavelength ranges from a series of optical signals, the device comprising:
- a polarization alignment means for substantially aligning substantially orthogonal polarization states of an optical input signal so as to produce a polarization aligned optical signal;
- a first polarization manipulation means for independently imparting a first controlled polarization manipulation to said polarization aligned optical signal so as to output a first polarization manipulated optical signal having one of at least two distinguishable polarization states including a first polarization state and a second polarization state;
- a first optical separation means for spatially separating a first selected optical signal from said series of optical signals when the polarization state of the polarization manipulated optical manipulated signal is in a first polarization stale, thereby forming a first and second output optical signal, and maintaining the spatial alignment of said first selected optical signal with said series of optical signals when the polarization manipulated optical signal is in a second polarization state so as to form a third optical output;
- a first reflection element, reflecting said first and third optical signal after they have passed through said first polarization manipulation means; said reflection element reflecting the first and third optical signals towards a second polarization manipulation means;
- a second polarization manipulation means for independently imparting a second controlled polarization manipulation to said first and third optical signals so as to output a second polarization manipulated optical signal having one of at least two distinguishable polarization states including a third polarization state and a fourth polarization state, wherein said first and second polarization manipulation means include portions formed as part of the same substrate of a liquid crystal device utilizing different electrode pairs;
- a second optical separation means for spatially separating a second selected optical signal from said series of optical signals when the polarization state of the second polarization manipulated optical signal is in a third polarization state, thereby forming a forth and fifth output optical signal, and maintaining the spatial alignment of said second selected optical signal with said series of optical signals when the polarization manipulated optical signal is in a fourth polarization state so as to form a sixth optical output.

10. A device for filtering a series of predetermined selected optical signals having predetermined wavelength ranges from a series of optical signals, the device comprising:
- a polarization alignment means for substantially aligning substantially orthogonal polarization states of an optical input signal so as to produce a polarization aligned optical signal;
- a first polarization manipulation means for independently imparting a first controlled polarization manipulation to said polarization aligned optical signal so as to output a first polarization manipulated optical signal having one of at least two distinguishable polarization states including a first polarization state and a second polarization state;
- a first optical separation means for spatially separating a first selected optical signal from said series of optical signals when the polarization state of the polarization manipulated optical manipulated signal is in a first polarization state, thereby forming a first and second output optical signal, and maintaining the spatial alignment of said first selected optical signal with said series of optical signals when the polarization manipulated optical signal is in a second polarization state so as to form a third optical output;
- a first reflection element, reflecting said first and third optical signal after they have passed through said first polarization manipulation means; said reflection element reflecting the first and third optical signals towards a second polarization manipulation means;
- a second polarization manipulation means for independently imparting a second controlled polarization manipulation to said first and third optical signals so as to output a second polarization manipulated optical signal having one of at least two distinguishable polarization states including a third polarization state and a fourth polarization state;
- a second optical separation means for spatially separating a second selected optical signal from said series of optical signals when the polarization state of the second polarization manipulated optical signal is in a third polarization state, thereby forming a forth and fifth output optical signal, and maintaining the spatial alignment of said second selected optical signal with said series of optical signals when the polarization manipulated optical signal is in a fourth polarization state so as to form a sixth optical output; wherein said first and second optical separation means include portions formed as part of the same substrate of a liquid crystal Fabry-Perot etalon device utilizing different electrode pairs.

* * * * *